United States Patent
Aizawa

(10) Patent No.: US 7,116,432 B2
(45) Date of Patent: Oct. 3, 2006

(54) POWER CONTROL FOR A PRINTING UNIT WITH A MAINTENANCE FUNCTION

(75) Inventor: Takayuki Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/642,191

(22) Filed: Aug. 18, 2003

(65) Prior Publication Data

US 2004/0051895 A1    Mar. 18, 2004

Related U.S. Application Data

(63) Continuation of application No. 09/223,021, filed on Dec. 30, 1998, now abandoned.

(30) Foreign Application Priority Data

Jan. 12, 1998    (JP)    ................ 10-003794

(51) Int. Cl.
*G06F 15/00*    (2006.01)

(52) U.S. Cl. .................. 358/1.14; 347/5; 713/300

(58) Field of Classification Search .......... 358/1.1, 358/1.2, 1.3, 1.4, 1.5, 1.6, 1.7, 1.8, 1.9, 1.11, 358/1.12, 1.13, 1.14, 1.15, 1.16, 1.17, 1.18; 347/1, 2, 3, 5; 713/321, 300
See application file for complete search history.

(56) References Cited

U.S. PATENT DOCUMENTS

| | | | |
|---|---|---|---|
| 4,814,794 A | 3/1989 | Sato | 347/28 |
| 5,241,349 A | 8/1993 | Nagasaka | 355/285 |
| 5,589,923 A | 12/1996 | Lee et al. | 399/78 |
| 5,636,332 A | 6/1997 | Hibino | 358/1.13 |
| 5,751,925 A | 5/1998 | Kataoka et al. | 358/1.16 |
| 5,798,925 A | 8/1998 | Poling | 364/469.03 |
| 5,809,369 A | 9/1998 | Furuya et al. | 399/70 |

FOREIGN PATENT DOCUMENTS

EP    0 526 189    2/1993

*Primary Examiner*—King Y. Poon
(74) *Attorney, Agent, or Firm*—Fitzpatrick, Cella, Harper & Scinto

(57) ABSTRACT

A clock supply from a clock controller to portions other than a host interface controller is stopped while periodically monitoring a data receiving state from a host. While executing a predetermined maintenance process, a power supplying mode is shifted to a low-power-consumption mode each time before it is shifted to the low-power-consumption mode.

3 Claims, 4 Drawing Sheets

FIG. 4

MEM MAP OF MEM MEDIUM

| DIRECTORY |
|---|
| FIRST DATA PROCESSING PROGRAM<br>PROGRAM CODES FOR THE STEPS OF<br>FLOWCHART SHOWN IN FIG. 3 |
| |

POWER CONTROL FOR A PRINTING UNIT WITH A MAINTENANCE FUNCTION

This application is a continuation of application Ser. No. 09/223,021, filed Dec. 30, 1998 now abandoned.

BACKGROUND OF THE INVENTION

1. Field of the Invention

The invention relates to a print controlling apparatus for controlling a printing process for a printer main body by communicating with a data processing apparatus through a predetermined communication medium. The invention also relates to a low power controlling method of such a print controlling apparatus and a computer-readable memory medium in which a program used for such apparatus and method has been stored.

2. Related Background Art

Hitherto, such a kind of printer, for example, a printer connected to a host computer is in a data standby mode when the printing operation is not performed. When the printer is in the data standby mode, the printer controller controls an operating mode of each section in a manner such that each block of the printer main body can immediately operate so as to enable the printer to immediately start a printing process when it receives a printing instruction from the host.

Since the conventional print controlling apparatus is constructed as mentioned above, an electric power is supplied to a data processor for performing a data communicating process with the host even in the data standby mode. There is, consequently, a tendency such that an electric power consumption of the whole printer is large in spite of a fact that the printing process is not executed.

On the other hand, a method of turning off a power supply in the data standby mode in order to reduce the electric power consumption in the data standby mode is also considered. In this case, however, the power supply has to be turned on when the printing operation is started and there is a problem such that a print processing time (particularly, a first printing time) becomes longer in an initial sequence (initial operation until a printer engine enters a printable mode) (it is waited until a trial driving or the like of an ink head is finished) or the like at the time of power-on.

The invention is made to solve the above problems and it is an object of the invention to provide a print controlling apparatus in which while periodically monitoring a data receiving state of a host computer, by shifting the power supplying mode to a low-power-consumption mode while executing a predetermined maintenance process each time before a power supplying mode is shifted to the low-power-consumption mode, an electric power consumption can be reduced in a printer standby mode where the apparatus waits for data from the host and a time that is required from the standby mode to the start of printing can be reduced. Another object of the invention is to provide a low power controlling method of such a print controlling apparatus and a computer-readable memory medium in which a program which is used for such apparatus and method has been stored.

SUMMARY OF THE INVENTION

According to the first aspect of the invention, there is provided a print controlling apparatus for controlling a printing process for a printer main body by communicating with a data processing apparatus through a predetermined communication medium, comprising: monitoring means for periodically monitoring a data receiving state from the data processing apparatus; discriminating means for discriminating whether an operating mode is a data standby mode or not from a periodical monitoring situation by the monitoring means; and power control means for, when it is determined by the discriminating means that the operating mode is the data standby mode, stopping a fetch cycle for a memory, thereby shifting a power supplying mode for the printer main body excluding the monitoring means to a low-power supplying mode.

According to the second aspect of the invention, after a predetermined driving for enabling a printer to start the printing was executed, the power control means stops the fetch cycle for the memory, thereby shifting the power supplying mode to the low-power supplying mode.

According to the third aspect of the invention, in the case where the monitoring means receives notifying information from the data processing apparatus while the power supplying mode for the printer main body is the low-power supplying mode, the power control means cancels the low-power supplying mode and returns the apparatus to a normal power supplying mode.

According to the fourth aspect of the invention, the apparatus further has memory means for storing a flag showing that the low-power supplying mode by the power control means is being executed.

According to the fifth aspect of the invention, the power control means stops the supply of a clock source, thereby shifting the power supplying mode to the low-power supplying mode.

According to the sixth aspect of the invention, in the case where a flag showing that the low-power supplying mode is being executed has been stored in the memory means, the power control means periodically executes a predetermined driving for enabling the printer to start the printing and, thereafter, stops the fetch cycle for the memory, thereby shifting a power supplying mode to the low-power supplying mode.

According to the seventh aspect of the invention, there is provided a low-power controlling method of a print controlling apparatus for controlling a printing process for a printer main body by communicating with a data processing apparatus through a predetermined communication medium, comprising: a monitoring step of periodically monitoring a data receiving state from the data processing apparatus; a discriminating step of discriminating whether an operating mode is a data standby mode or not from a periodical monitoring situation by the monitoring step; and a low-power shifting step of, when it is determined by the discriminating step that the operating mode is the data standby mode, stopping a fetch cycle for a memory, thereby shifting a power supplying mode for the printer main body to a low-power supplying mode.

According to the eighth aspect of the invention, there is provided a computer-readable memory medium in which a program for controlling a printing apparatus for performing a printing process for a printer main body by communicating with a data processing apparatus through a predetermined communication medium has been stored, wherein the program comprises: a monitoring step of periodically monitoring a data receiving state from the data processing apparatus; a discriminating step of discriminating whether an operating mode is a data standby mode or not from a periodical monitoring situation by the monitoring step; and a low-power shifting step of, when it is determined by the discriminating step that the operating mode is the data standby mode, stopping a fetch cycle for a memory, thereby shifting a power supplying mode for the printer main body to a low-power supplying mode.

BRIEF DESCRIPTION OF THE DRAWINGS

FIG. 4 is a diagram for explaining a memory map of a memory medium to store various data processing programs which can be read out by the print controlling apparatus according to the invention.

DETAILED DESCRIPTION OF THE PREFERRED EMBODIMENTS

[First Embodiment]

Figure 1:
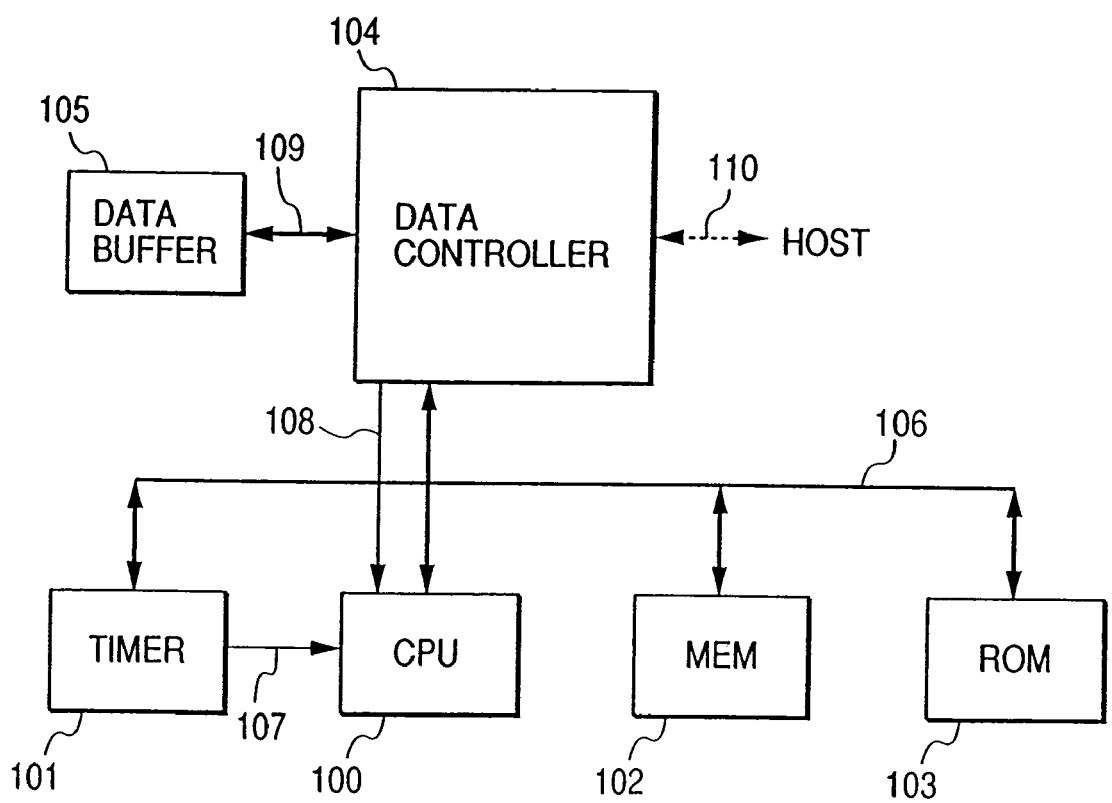
FIG. 1 is a block diagram for explaining a construction of a print controlling apparatus showing the first embodiment of the invention.

FIG. 1 is a block diagram for explaining a construction of a print controlling apparatus showing the first embodiment of the invention.

In the diagram, reference numeral 100 denotes a CPU for executing a control program stored in an ROM 103 or an external memory (not shown) and integratedly controls a communication control with a host, an analysis of received data, an image developing process, a transferring process of the developed image data to an engine, a fault monitoring process of the engine, and a notifying process of a fault occurred.

Reference numeral 101 denotes a timer for generating a first interrupt signal 107 to the CPU 100 each time the timer 101 counts a predetermined time. Reference numeral 102 denotes a memory such as an RAM or the like for storing image data which is outputted to the printer, a flag showing a low-power-consumption mode, and the like.

Reference numeral 104 denotes a data controller constructed in a manner such that a data communication with the host through a host interface 110, a data accumulating process into a data buffer 105 through a buffer interface 109, and the like are controlled and the data controller can mutually communicate with the CPU 100 through a CPU bus 106.

Reference numeral 108 denotes a second interrupt signal which is outputted from the data controller 104 to the CPU 100 on the basis of a data communicating request through the host interface 110.

Figure 2:
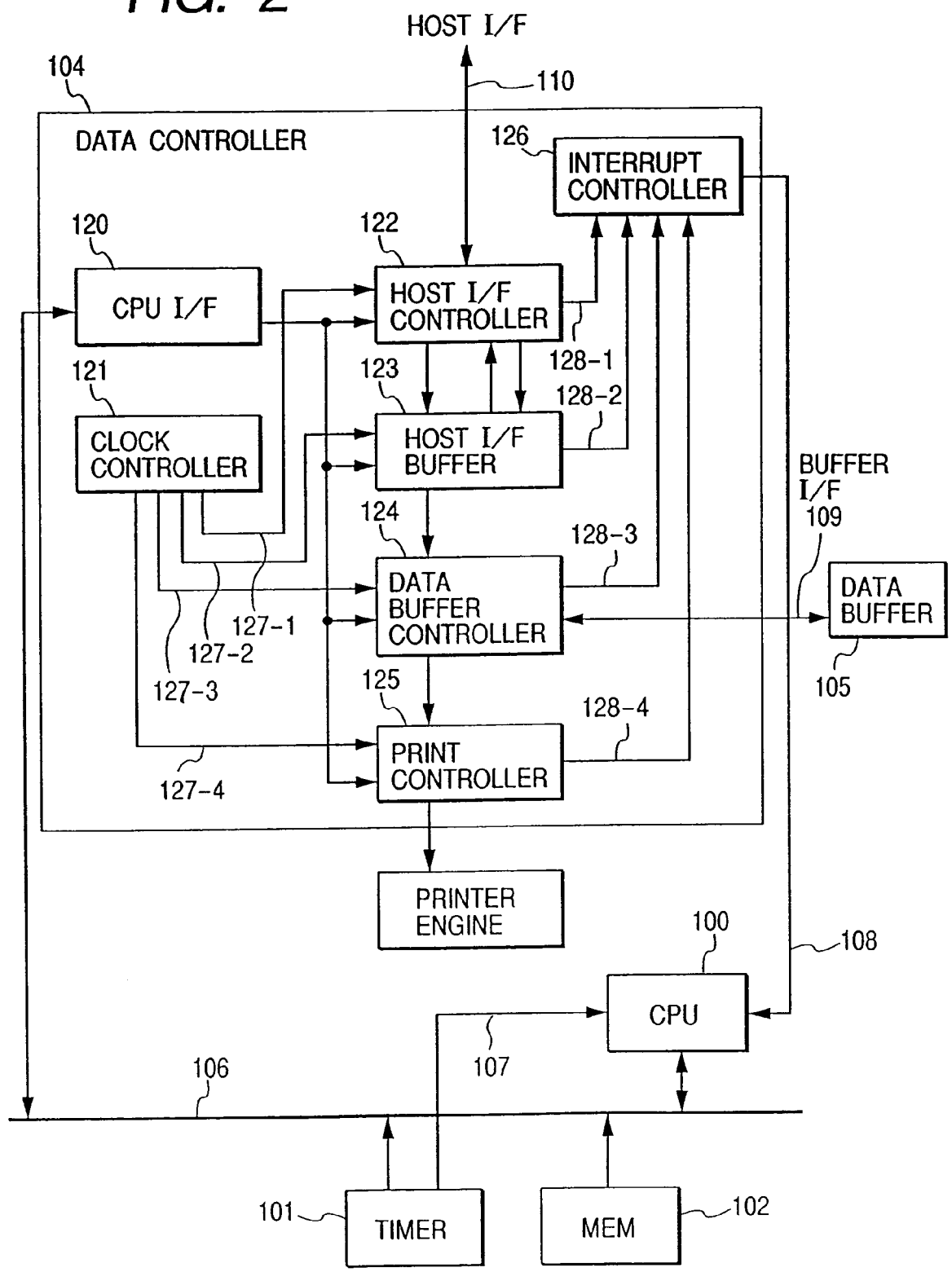
FIG. 2 is a block diagram for explaining a detailed construction of a data controller shown in FIG. 1.

FIG. 2 is a block diagram for explaining a detailed construction of the data controller 104 shown in FIG. 1 and the same component elements as those in FIG. 1 are designated by the same reference numerals.

In the diagram, reference numeral 120 denotes a CPU interface for controlling a data communicating process with the host, a data accumulating process to the data buffer 105, and a print data transferring process to the engine on the basis of an instruction to the CPU 100 through the CPU bus 106.

Reference numeral 121 denotes a clock controller for supplying a predetermined clock to each block of the data controller 104; 122 a host interface controller for receiving print information from the host through the host interface 110 and outputting a status of the engine to the host. The host interface controller 122 generates an interrupting request 128-1 to an interrupt controller 126. Further, the host interface controller 122 is made operative by a clock 127-1 which is supplied from the clock controller 121.

Reference numeral 123 denotes a host interface buffer for temporarily storing data which is transmitted and received by the host interface 110. The host interface buffer 123 generates an interrupting request 128-2 to the interrupt controller 126. Further, the host interface buffer 123 is made operative by a clock 127-2 which is supplied from the clock controller 121.

Reference numeral 124 denotes a data buffer controller for controlling input and output of data to/from the data buffer 105. The data buffer controller 124 generates an interrupting request 128-3 to the interrupt controller 126. Further, the data buffer controller 124 is made operative by a clock 127-3 which is supplied from the clock controller 121.

Reference numeral 125 denotes a print controller for transmitting print data to a printer engine, for example, a printer head in the embodiment. The print controller 125 generates an interrupting request 128-4 to the interrupt controller 126. Further, the print controller 125 is made operative by a clock 127-4 which is supplied from the clock controller 121.

Reference numeral 126 denotes the interrupt controller for generating the second interrupt signal 108 to the CPU 100 on the basis of each of the interrupting requests 128-1 to 128-4 from the blocks.

In the memory controller constructed as mentioned above, the CPU 100 sets the timer 101 each time a command and data are received from the host interface 110. At the same time, the CPU 100 writes a flag showing that the power supplying mode is not the low-power-consumption mode into the memory 102.

When the timer 101 times out, the timer 101 activates the first interrupt signal 107 and notifies the CPU 100 of a fact that there is no communication with the host for a predetermined period of time. When the CPU 100 receives the interrupt signal 107, the CPU 100 reads the memory 102, knows that the first interrupt signal 107 has been received in a state where the power supplying mode is not the low-power-consumption mode, and starts a preparation for shifting to the low-power-consumption mode.

First, the CPU 100 stops the supply of the clocks 127-1 to 127-4 to the blocks of the host interface buffer 123, data buffer controller 124, and print controller 125 other than the host interface controller 122 by using the clock controller 121 of the data controller 104, respectively. Subsequently, the CPU 100 allows a flag showing that the power supplying mode has been shifted to the low-power-consumption mode to be stored into the memory 102 and sets the timer 101. Finally, the CPU 100 stops an own fetch cycle in a state where the first and second interrupt signals 107 and 108 can be received, thereby completing the shift of the power supplying mode of the printer to the low-power-consumption mode. First and second returning methods from the low-power-consumption mode will now be described hereinbelow.

First, when the first interrupt signal 107 is received, the CPU 100 starts the fetch cycle and knows the reception of the first interrupt signal 107. By reading the flag stored in the memory 102, the CPU 100 knows that the power supplying mode is the low-power-consumption mode. The CPU 100 executes a maintenance work (including the cleaning at the start of the printer) of the printer itself which is executed by the printer itself at a predetermined cycle in order to set the apparatus into a state where the printer can immediately print any time. After completion of the maintenance of the printer itself, the foregoing procedure is executed, and the power supplying mode is again shifted to the low-power-consumption mode.

When the second interrupt signal 108 is received, the CPU 100 starts the fetch cycle. When the CPU 100 knows the reception of the second interrupt signal 108, the CPU 100 reads the flag stored in the memory 102, thereby knowing the reception of a communicating request from the host during the low-power-consumption mode. The CPU 100 instructs the clock controller 121 to start to supply the corresponding clocks 127-1 to 127-4 to the blocks (all blocks) of the data controller 104.

When the supply of the clocks 127-1 to 127-4 is started, the data from the host can flow as usual.

At this time, even in the low-power-consumption mode, the maintenance of the printer itself is periodically executed on the basis of the first interrupt signal 107 by the timer 101. Therefore, the initial state of a cleaning or the like at the start of the printer is unnecessary.

A characteristic construction of the embodiment will now be described hereinbelow with reference to FIGS. 1 and 2 and the like.

A print controlling apparatus for controlling a printing process for a printer main body by communicating with a data processing apparatus (not-shown host computer) through a predetermined communication medium constructed as mentioned above comprises: monitoring means (host interface controller 122) for periodically monitoring a data receiving state from the data processing apparatus; discriminating means for discriminating whether an operating mode is a data standby mode or not from a periodical monitoring situation by the monitoring means (the CPU 100 executes the control program stored in the ROM 103 or an external memory (not shown) and discriminates the data standby mode from a status of the data controller 104 each time the first interrupt signal 107 is received from the timer 101); and power control means for shifting a power supplying mode for the printer main body excluding the monitoring means to the low-power supplying mode in the case where it is determined by the discriminating means that the operating mode is the data standby mode (the CPU 100 executes the control program stored in the ROM 103 or external memory (not shown) and controls). Therefore, in a mode except for the mode of monitoring the communicating request with the host, the power supplying mode of the printer main body is shifted to the low-power-consumption mode, so that an electric power consumption in a data standby mode from the host can be remarkably reduced.

Since the power control means stops the fetch cycle for the memory resource and shifts the power supplying mode to the low-power supplying mode, the data process regarding the control of the printer main body is also stopped, thereby enabling the electric power consumption in the data standby mode from the host to be extremely reduced.

Further, after a predetermined driving for enabling the printer to start the printing was executed, the power control means stops the fetch cycle for the memory resource and shifts the power supplying mode to the low-power supplying mode. Therefore, the data process regarding the control of the printer main body is also stopped and the electric power consumption in the data standby mode from the host can be remarkably reduced. In the case where the operating mode is shifted from the data standby mode to the data receiving state, the printing process can be started without performing the predetermined driving to be performed before the start of the normal printing process. The first printing time can be fairly reduced.

In the case where the host interface controller 122 receives the notifying information from the data processing apparatus while the power supplying mode for the printer main body is the low-power supplying mode, the low-power supplying mode is cancelled and the power supplying mode is returned to the normal power supplying mode. Therefore, when some notifying information is received from the data processing apparatus during the data standby mode, the operating mode can be automatically shifted to the data receiving state.

Further, since the apparatus has the memory means (memory 102) for storing the flag showing that the low-power supplying mode is being executed by the CPU 100, the present power supplying mode can be confirmed at any time.

Since the CPU 100 stops the supply of the clock source (provided in the clock controller 121) and shifts the power supplying mode to the low-power supplying mode, the electric power consumption can be efficiently reduced.

Further, in the case where the flag showing the execution of the low-power supplying mode has been stored in the memory 102, after a predetermined driving for enabling the printer to start the printing was periodically executed, the CPU 100 stops the fetch cycle for the memory resource and shifts the power supplying mode to the low-power supplying mode. Therefore, the electric power consumption can be further efficiently reduced.

Figure 3:
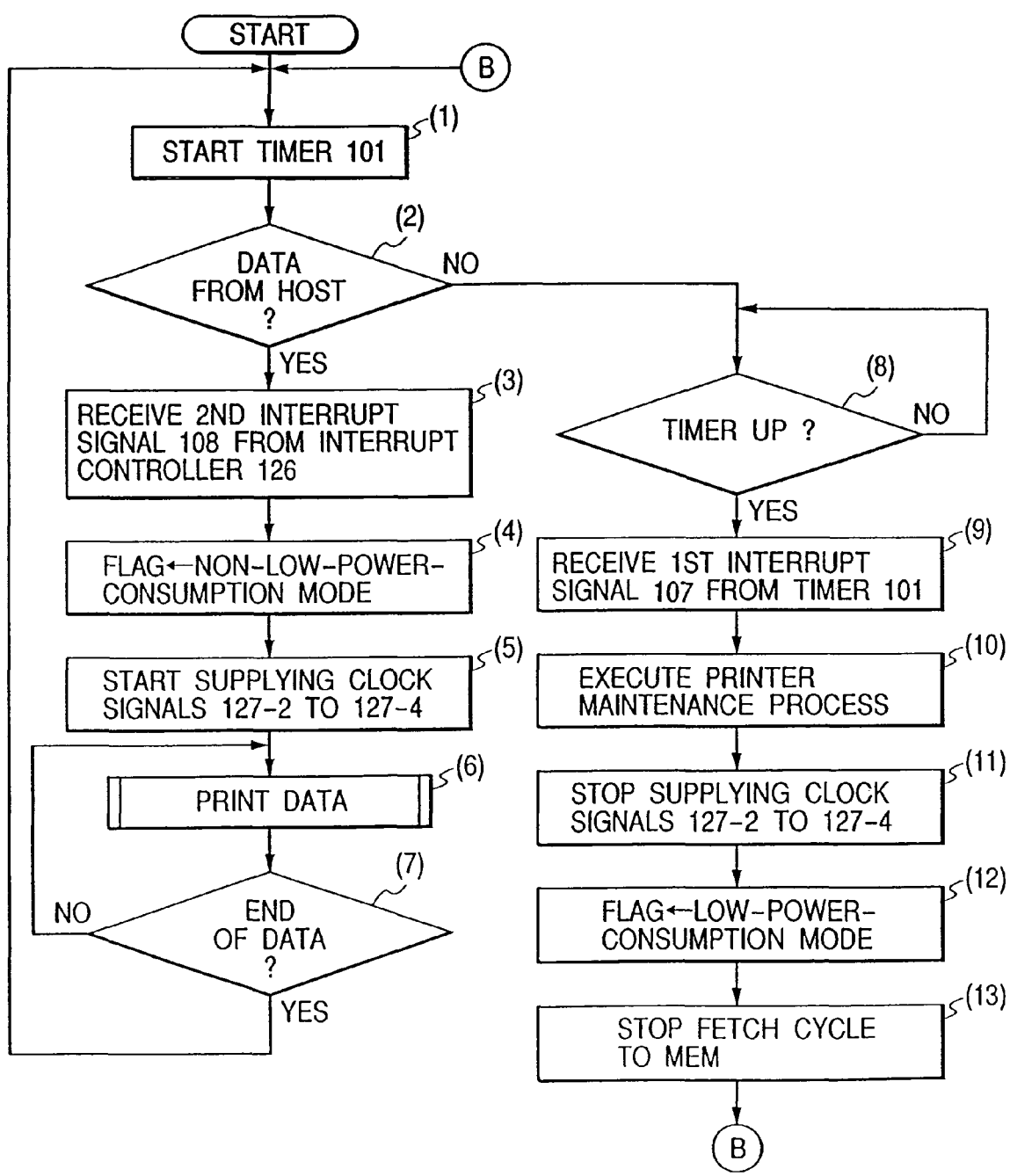
FIG. 3 is a flowchart showing an example of a data processing procedure of the print controlling apparatus according to the invention.

FIG. 3 is a flowchart showing an example of a data processing procedure of the print controlling apparatus according to the invention. Reference numerals (1) to (13) denote processing steps.

First, the timer 101 is started (1). The apparatus waits until the data is received from the host (2). If YES in step (2), namely, when the host interface controller 122 recognizes that the data is received through the host interface 110, the second interrupt signal 108 is outputted from the interrupt controller 126 to the CPU 100 (3).

The CPU 100 subsequently allows a flag which is assured in the memory 102 and shows the low-power-consumption mode to be stored as a non-low-power-consumption mode (4). The CPU 100 starts to supply the clocks 127-2 to 127-4 from the clock controller 121 (5). The host interface buffer 123, data buffer controller 124, and print controller 125 are made operative, respectively.

The printing process of the print data received from the host is executed (6). Until the data end is discriminated in step (7), the processing routine is returned to step (6) and the printing process is continued.

When it is decided in step (2) that no data is received from the host, a check is made in step (8) to see if the timer 101 has timed up. If YES, the first interrupt signal 107 is outputted to the CPU 100 (9). In response to the first interrupt signal, the CPU 100 executes the foregoing maintenance process for enabling the printer to print (10).

The supply of the clocks 127-2 to 127-4 from the clock controller 121 is stopped (11). Information showing the low-power-consumption mode is stored in the flag on the memory 102 (12). The fetch cycle for the memory resource in the RAM or the like is stopped (13). The processing routine is returned to step (1).

A characteristic construction of the embodiment will now be described hereinbelow with reference to FIG. 3.

A low-power controlling method of a print controlling apparatus for controlling a printing process for a printer main body by communicating with a data processing apparatus (not-shown host computer) through a predetermined communication medium constructed as mentioned above comprises: a monitoring step (step (2) in FIG. 3) of periodically monitoring a data receiving state from the data processing apparatus; a discriminating step (step (2) in FIG. 3) of discriminating whether an operating mode is a data standby mode or not from a periodical monitoring situation by the monitoring step; and a low-power shifting step (steps (8) to (13) in FIG. 3) of shifting a power supplying mode for the printer main body to a low-power supplying mode in the case where it is determined by the discriminating step that the operating mode is the data standby mode. In the modes other than the mode of monitoring a communicating request with the host, the power supplying mode for the printer main body is shifted to the low-power-consumption mode. The electric power consumption in the data standby mode from the host can be remarkably reduced.

A construction of a data processing program which can be read out by a printing system to which the print controlling apparatus according to the invention can be applied will now be described hereinbelow with reference to a memory map shown in FIG. 4.

FIG. 4 is a diagram for explaining a memory map of a memory medium (FD, CD-ROM, etc.) to store various data processing programs which can be read out by the print controlling apparatus according to the invention.

Although not particularly shown, information to manage programs which are stored in the memory medium, for example, version information, person who made the programs, and the like are also stored. There is also a case where information depending on the OS or the like on the program reading side, for example, an icon to identify and display the program or the like is stored.

Further, the data depending on various programs is also managed in a directory. There is also a case where a program to install various programs into a computer, a program to decompress a program to install when such a program has been compressed, or the like is stored.

The functions shown in FIG. 3 according to the embodiment can be also executed by the host computer on the basis of a program which is installed from the outside. In this case, the invention is also applied to a case where information including the programs is supplied to an output apparatus by a memory medium such as CD-ROM, flash memory, FD, or the like or from an external memory medium through a network.

It will be obviously understood that the object of the invention is also accomplished by a method whereby the memory medium on which the program codes of software to realize the functions of the embodiment mentioned above have been recorded is supplied to a system or an apparatus and a computer (or CPU or MPU) of the system or apparatus reads out the program codes stored in the memory medium and executes them.

In this case, the program codes themselves read out from the memory medium realize the novel functions of the invention and the memory medium on which the program codes have been stored constructs the invention.

As a memory medium to supply the program codes, it is possible to use any one of, for example, a floppy disk, a hard disk, an optical disk, a magnetooptical disk, a CD-ROM, a CD-R, a magnetic tape, a non-volatile memory card, an ROM, an EEPROM, and the like.

It will be obviously understood that the invention incorporates not only a case where the functions of the foregoing embodiment are realized by executing the read-out program codes by the computer but also a case where on the basis of an instruction of the program codes, the OS (operating system) or the like which operates on the computer executes a part or all of the actual processes and the functions of the foregoing embodiment are realized by those processes.

Further, it will be also obviously understood that the invention also incorporates a case where after the program codes read out from the memory medium were written into a memory provided for the function expanding board inserted into a computer or a function expanding unit connected to the computer, the CPU or the like provided for the function expanding board or function expanding unit executes a part or all of the actual processes on the basis of an instruction of the program codes, and the functions of the foregoing embodiment are realized by those processes.

According to the embodiment, when the communication from the host is finished and a predetermined time elapses, the memory and timer are set and the power supplying mode is shifted to the low-power-consumption mode. When the timer times up, the apparatus exits from the low-power-consumption mode, the maintenance of the printer is executed, and the power supplying mode is again shifted to the low-power-consumption mode. When there is a communication from the interface in the low-power-consumption mode, the control CPU reads out the memory and confirms that there is a recovery from the low-power-consumption mode. When the power supplying mode is returned from the low-power-consumption mode, the control CPU omits the cleaning initial setting which is executed at the time of power-on, so that the print starting time can be reduced.

What is claimed is:

1. A print controlling apparatus for controlling a printing process for a printer main body by communicating with a data processing apparatus through a predetermined communication medium, said print controlling apparatus comprising:

monitoring means for periodically monitoring a data receiving state from the data processing apparatus;

discriminating means for discriminating whether an operating mode is a data standby mode or not from a periodical monitoring situation by said monitoring means;

power control means for, when it is determined by said discriminating means that the operating mode is the data standby mode, stopping a fetch cycle for a memory, thereby shifting a power supplying mode for the printer main body excluding said monitoring means to a low-power supplying mode; and memory means for storing a flag showing that the low-power supplying mode by said power control means is being executed, wherein in the case where the flag showing that the low-power supplying mode is being executed has been stored in said memory means, said power control means periodically executes a predetermined driving for enabling the printer main body to start printing, and thereafter stops the fetch cycle for the memory, thereby shifting the power supplying mode to the low-power supplying mode.

2. A low-power controlling method of a print controlling apparatus for controlling a printing process for a printer main body by communicating with a data processing apparatus through a predetermined communication medium, said low-power controlling method comprising:

a monitoring step of periodically monitoring a data receiving state from the data processing apparatus;

a discriminating step of discriminating whether an operating mode is a data standby mode or not from a periodical monitoring situation in said monitoring step;

a power control step of, when it is determined in said discriminating step that the operating mode is the data standby mode, stopping a fetch cycle for a memory, thereby shifting a power supplying mode for the printer main body to a low-power supplying mode; and a storage step of storing a flag showing that the low-power supplying mode in said power control step is being executed, wherein in the case where the flag showing that the low-power supplying mode is being executed has been stored in said storage step, a predetermined driving for enabling the printer main body to start printing is periodically executed in said power control step, and thereafter the fetch cycle for the memory is stopped, thereby shifting the power supplying mode to the low-power supplying mode.

3. A computer-readable memory medium in which a program for controlling a printing apparatus for performing a printing process for a printer main body by communicating with a data processing apparatus through a predetermined communication medium has been stored, wherein said program comprises:

a monitoring step of periodically monitoring a data receiving state from the data processing apparatus;

a discriminating step of discriminating whether an operating mode is a data standby mode or not from a periodical monitoring situation in said monitoring step;

a power control step of, when it is determined in said discriminating step that the operating mode is the data standby mode, stopping a fetch cycle for a memory, thereby shifting a power supplying mode for the printer main body to a low-power supplying mode; and a storage step of storing a flag showing that the low-power supplying mode in said power control step is being executed, wherein in the case where the flag showing that the low-power supplying mode is being executed has been stored in said storage step, a predetermined driving for enabling the printer main body to start printing is periodically executed in said power control step, and thereafter the fetch cycle for the memory is stopped, thereby shifting the power supplying mode to the low-power supplying mode.

* * * * *